(12) United States Patent
Robinson et al.

(10) Patent No.: US 6,643,429 B2
(45) Date of Patent: Nov. 4, 2003

(54) DISPERSION COMPENSATION APPARATUS AND METHOD UTILISING SAMPLED BRAGG GRATINGS

(75) Inventors: Alan Robinson, Harlow (GB); Terry V Clapp, Herts (GB)

(73) Assignee: Nortel Networks Limited, St. Laurent (CA)

( * ) Notice: Subject to any disclaimer, the term of this patent is extended or adjusted under 35 U.S.C. 154(b) by 77 days.

(21) Appl. No.: 09/876,316

(22) Filed: Jun. 7, 2001

(65) Prior Publication Data

US 2002/0191912 A1 Dec. 19, 2002

(51) Int. Cl.$^7$ .............................. G02B 6/34; H04B 10/12
(52) U.S. Cl. .............................. 385/37; 385/10; 385/31; 385/40; 359/127; 359/130; 359/161
(58) Field of Search ............................. 385/31, 37, 10, 385/40; 359/130, 127, 161

(56) References Cited

U.S. PATENT DOCUMENTS

| 4,953,939 | A | | 9/1990 | Epworth | ................... | 350/96.19 |
|---|---|---|---|---|---|---|
| 5,694,501 | A | * | 12/1997 | Alavie et al. | ................. | 372/102 |
| 5,717,799 | A | | 2/1998 | Robinson | ..................... | 385/37 |
| 5,870,512 | A | * | 2/1999 | Koch et al. | ................... | 359/130 |
| 5,974,206 | A | | 10/1999 | Bricheno et al. | .............. | 385/11 |
| 5,987,200 | A | | 11/1999 | Fleming et al. | ............... | 385/37 |
| 6,097,862 | A | * | 8/2000 | Abramov et al. | ............ | 359/130 |
| 6,334,013 | B1 | * | 12/2001 | Laming et al. | ................ | 385/10 |
| 6,356,684 | B1 | * | 3/2002 | Patterson et al. | ............ | 359/130 |
| 6,515,778 | B1 | * | 2/2003 | Epworth et al. | ............. | 359/161 |
| 2001/0021294 | A1 | * | 9/2001 | Cai et al. | ........................ | 385/37 |
| 2002/0094164 | A1 | * | 7/2002 | Fells et al. | ..................... | 385/37 |
| 2002/0114570 | A1 | * | 8/2002 | Matsumoto et al. | ........... | 385/37 |
| 2002/0181914 | A1 | * | 12/2002 | Jansen | .......................... | 385/130 |
| 2003/0025975 | A1 | * | 2/2003 | Griffin | .......................... | 359/238 |
| 2003/0039023 | A1 | * | 2/2003 | Romagnoli et al. | .......... | 359/326 |

FOREIGN PATENT DOCUMENTS

JP     2000275453 A  * 10/2000   ............ G02B/06/10

OTHER PUBLICATIONS

Eggleton, "Dispersion compensation in 20 Gbit/s dynamic nonlinear lightwave systems using electrically tunable chirped fibre grating" Electronics Letters, vol 35, No. 10, May 13, 1999, pp. 832–833.

* cited by examiner

Primary Examiner—John D. Lee
Assistant Examiner—Daniel Valencia
(74) Attorney, Agent, or Firm—Barnes & Thornburg

(57) ABSTRACT

Dispersion compensation devices are described which comprise waveguides including sampled Bragg gratings which exhibit comb-like reflectance characteristics. The profile of effective refractive index along the length of the grating is controlled to adjust the position of the teeth and/or to control the dispersion exhibited by the device (i.e. to control the chirp of the grating). The devices can thus be used to provide dispersion compensation to any one of a number of wavelength channels in a WDM system. In preferred arrangements, the effective refractive index distribution is set by a applying a temperature distribution along the length of the grating, or by setting an applied electric field.

61 Claims, 10 Drawing Sheets

DISPERSION COMPENSATION APPARATUS AND METHOD UTILISING SAMPLED BRAGG GRATINGS

FIELD OF THE INVENTION

This invention relates to the compensation of chromatic dispersion, hereinafter referred to as dispersion, in optical transmission systems. In particular, although not exclusively, this invention relates to the compensation of dispersion in Wavelength Division Multiplexed (WDM) optical communications systems.

BACKGROUND TO THE INVENTION

Generally, chromatic dispersion is the dependence of wave velocity on wavelength as a wave travels through a medium. In the field of optical communications, chromatic dispersion is used to refer to the dependence of group delay, $\tau$, on wavelength, $\lambda$.

Linear (first order) dispersion, D, is the measure of the rate of change of group delay, $\tau$, with wavelength $\lambda$. ($D=d\tau/d\lambda$). Linear dispersion is typically measured in picoseconds per nanometer (ps/nm). In the case of a transmission medium, for instance, an optical fibre waveguide, whose waveguiding properties are uniform along its length, the linear dispersion exhibited by the medium is proportional to its length and so, for such a medium, it is convenient to define its linear dispersion per unit length, also known as its linear dispersion power. This is typically measured in picoseconds per nanometer per kilometer (ps/nm/km).

The value of the linear dispersion of a transmission path is generally itself a function of wavelength, and so there is a quadratic (second order) dispersion term, Q, also known as dispersion slope, which is a measure of the rate of change of linear dispersion with wavelength. ($Q=dD/d\lambda=d^2\tau/d\lambda^2$). This is typically measured in picoseconds per nanometer squared (ps/nm$^2$). In some, but not all instances, the effects of quadratic dispersion in NDS and DC fibre (non dispersion shifted fibre, and dispersion compensating fibre) are small enough not to assume significance. There are also higher dispersion terms, whose effects generally assume even less significance.

In a digital transmission system the presence of dispersion leads to pulse broadening, and hence to a curtailment of system reach before some form of pulse regeneration becomes necessary. The problem presented by dispersion increases rapidly with increasing bit rate. This is because, on the one hand, increasing the bit rate produces increased spectral broadening of the pulses, and hence increased dispersion mediated pulse broadening; while on the other hand, increasing the bit rate also produces a reduction in the time interval between consecutive bits. In a WDM digital transmission system, it is not practical to minimise the problems of dispersion by choosing to employ a transmission medium exhibiting near-zero first order dispersive power because low first order dispersive power is associated with aggravated non-linear (e.g. four-wave mixing) distortion.

A known solution to this problem is to employ "managed dispersion" in which near-zero aggregate linear dispersion over a particular transmission path is achieved by the use of alternating sections respectively exhibiting positive linear dispersion and negative linear dispersion, for instance by the use of non-dispersion-shifted (NDS) and dispersion compensating (DC) optical fibre waveguide.

However, broad band dispersion compensating modules based on dispersion compensating fibre cannot provide sufficient accuracy to compensate all channels in a WDM system simultaneously.

Another solution has been to use dispersion compensation devices based on spectrally distributed reflection of optical signals from waveguides incorporating chirped Bragg gratings (i.e. gratings in which the effective pitch $n_{eff} \Lambda$ varies along the grating's length, where $n_{eff}$ is the effective refractive index and $\Lambda$ is the physical pitch). Light of a particular wavelength $\lambda$ will, in effect, be reflected from a point along the grating at which the condition:

$$\lambda = 2n_{eff}\Lambda \qquad (1)$$

is satisfied. Thus, the chirped Bragg grating exhibits/provides chromatic dispersion because signal components at different wavelengths will be reflected, effectively, at different positions along the grating's length, and so will have been delayed by different amounts of time when they reemerge from the waveguide after reflection.

The use of both linearly chirped and quadratically chirped gratings for dispersion compensation purposes are known. Also known are adjustable dispersion compensation devices in which the effective pitch of a Bragg reflection grating is adjusted by applying uniform or non-uniform strain (to alter physical pitch) or by applying a thermal gradient (to alter effective refractive index). For a grating with uniform physical pitch, controlling the magnitude of the thermal gradient controls the magnitude of the resulting chirp, and thus there is provided a form of adjustable amplitude linear dispersion compensation device. Such a device is for instance described by B J Eggleton et al. in, "Dispersion compensation in 20 Gbit/s dynamic nonlinear lightwave systems using electrically tunable chirped fibre grating", Electronics Letters Vol. 35, No. 10, pp 832–3.

However, it is difficult to manufacture very long fibre Bragg gratings (>1 m) required for broadband compensation (i.e. for dispersion compensation across the entire band occupied by signals in a WDM system.

For optimum performance in such a system it is desirable to actively adjust the dispersion of each channel independently, to minimise transmission degradation. The known methods based on straining or temperature tuning of silica-based waveguides are in use but have a limited range. Also, it has been necessary to use large numbers of slightly different designs to support high channel count WDM systems.

Etalon-based devices have also been used for dispersion compensation purposes, but have insufficient dispersion and slope uniformity within the information bandwidth to be applicable in high spectral density, high bit rate WDM systems.

Embodiments of the present invention therefore aim to provide dispersion compensation apparatus, and corresponding methods, which overcome, at least partially, one or more of the above-mentioned problems/disadvantages associated with the prior art.

A further object of embodiments, not least for reasons of minimising inventory, for operating in a WDM system, is to provide a Bragg grating dispersion compensator that is capable of providing dispersion compensation for any individual one of the channels of that WDM system.

SUMMARY OF THE INVENTION

According to a first aspect of the present invention there is provided dispersion compensation apparatus comprising a waveguide comprising a sampled Bragg grating extending along a length of the waveguide, the sampled Bragg grating exhibiting a comb-link reflectance versus wavelength spectrum comprising a plurality of teeth; and adjustment apparatus arranged to adjust an effective refractive index of the waveguide along at least a portion of said length. By making this adjustment, the positions of the teeth in the spectrum may, for example, be shifted to bring one of the teeth into register with a bandwidth of a signal input to the waveguide, and/or the dispersion exhibited by the grating may be adjusted.

Sampled Bragg gratings are known. In non-sampled gratings, the effective refractive index along the waveguide structure is modulated in some way (e.g. in a periodic fashion) to produce the grating "elements".

In a sampled grating, the depth of the refractive index modulation is itself modulated in some fashion.

In preferred embodiments, the sampled gratings comprise a sequence of groups of grating elements, connected by sections of waveguide in which the effective refractive index is substantially unmodulated (i.e. they contain no grating elements). However, this is not essential, and a comb-like response may be exhibited by a sampled grating where the modulation depth is modulated in some other fashion (e.g. it just varies sinusoidally along the waveguide's length, never reaching zero).

Thus, in this specification, the term "sampled Bragg grating" is intended to encompass any Bragg grating arranged to provide a comb-like reflectance characteristic (i.e. repeated pass/reflection bands).

The simplest way to imagine a sampled grating is as follows:

Consider a conventional grating.

Make an identical grating with the coupling coefficient M times higher.

Leave the first N periods intact, erase the next (M−1)×N, and repeat.

We now have a sampled grating with the same average coupling strength as before.

Thus, the sampled grating consists of a sequence of groups of grating elements (i.e. grating samples) spaced apart along the length of the waveguide in which the grating is formed.

The sampled grating described above will give approximately the same peak reflectance as the original unsampled grating, with the pass-band repeating at a frequency which depends on the sample period.

Thus, whereas the unsampled grating exhibits a single reflectance band, the sampled grating exhibits a comb-like reflectance characteristic, with the spacing of the "teeth" of the comb being determined by the optical path length between the samples. This optical path length depends on the physical separation of the samples and the effective refractive index of the portions of the waveguide connecting the samples. This comb-like characteristic results from the fact that each short grating sample acts as a broad-band reflector. Reflected signal components at a wavelength λ from adjacent samples will constructively interfere if $$\lambda = 2k \cdot n_{eff} \cdot B \quad (2)$$

where k is an integer, $n_{eff}$ is the effective refractive index of the waveguide connecting the samples, and B is the sample period.

Each "tooth" will have substantially the same shape and width as the single reflectance band provided by the corresponding unsampled grating. Furthermore, when a signal whose bandwidth lies within a particular tooth is reflected by the sampled grating, the signal has imparted to it substantially the same dispersion as would be imparted to a corresponding signal on reflection by the corresponding unsampled grating.

Thus, sampling a grating results in a repetition of its reflectance (including dispersion) characteristics at a plurality of positions in the wavelength spectrum. The reflection characteristics corresponding to a particular tooth in the reflection spectrum are determined by the sampled grating as a whole, and the positions of the teeth are determined by the sampling period and refractive index along the grating.

The dispersion compensation apparatus according to the first aspect of the present invention provides the advantage that, by employing a sampled grating having a comb-link reflectance spectrum, then provided that a signal bandwidth lies within the comb it is only necessary to adjust the refractive index along the waveguide by a small amount in order to bring one of the teeth of the comb into register with the signal bandwidth to reflect it. Thus, tuning may be achieved quickly.

Furthermore, the same dispersion compensation apparatus can be used to compensate for dispersion in any signal having a bandwidth lying within the comb characteristics, so the same apparatus can be used to compensate for dispersion in all channels of a WDM system. Rather than requiring a large number of dispersion compensators of different designs, a corresponding number of nominally identical designs in accordance with the first aspect of the present invention can be used.

A further advantage is that, by adjusting the effective refractive index along the grating's length, the dispersion provided to a signal on reflection may be adjusted/controlled.

Preferably the adjustment apparatus is arranged to control the average value of effective refractive index over the length. This may be achieved by making a uniform change to the value of the refractive index all along the length, or by simply altering its values at specific points along that length.

Preferably, the adjustment apparatus is also arranged to set a desired distribution of effective refractive index along this length. In this way, the dispersion exhibited by the device to incident optical signals can be controlled and adjusted.

Preferably, the grating is pre-chirped, but alternatively a chirp may be introduced by suitable adjustment of the refractive index profile along the length.

It will be apparent that by arranging for suitable distributions in refractive index, adjustable amounts of linear dispersion, quadratic dispersion (dispersion slope) and even higher orders of dispersion may be compensated.

In certain preferred embodiments, the control of effective refractive index along the length of the waveguide is achieved by controlling the temperature profile of a cladding material over, under, or surrounding a waveguide core.

In alternative preferred embodiments, the refractive index control is achieved by using a waveguide which has a core and a plurality of slots interrupting the core, each slot being filled with a material having a high temperature coefficient of refractive index or a refractive index which is a function of applied electric field. By controlling the temperature or electric field applied to the material in each slot a desired average effective refractive index or distribution along the length of the waveguide can be achieved.

Preferably, the slots are arranged between each and every pair of adjacent grating samples along the waveguide, such that by adjusting the effective refractive index of the material in the slots, the optical path lengths between the grating samples, and hence the reflectance properties of the grating, can be controlled.

A further aspect of the present invention provides dispersion compensation apparatus comprising: a waveguide comprising a sampled Bragg grating extending along a length of the waveguide, the sampled Bragg grating exhibiting a comb-like reflectance versus wavelength spectrum comprising a plurality of teeth; and adjustment apparatus for controlling an effective refractive index profile of the waveguide along said length.

Such apparatus provides the advantage that the positions of the teeth and/or the dispersion exhibited by the device can be adjusted so as to compensate for dispersion in any signal having a bandwidth lying within the comb spectral characteristics.

A further aspect of the present invention provides a waveguide comprising: a core formed from a first material; a sampled Bragg grating comprising a sequence of grating samples spaced apart along said core; and a plurality of waveguide sections formed from a second material, each section at least partially interrupting the core and being arranged in the optical path between a respective pair of adjacent grating samples, the second material having a higher thermal coefficient of refractive index than the first, whereby the optical path lengths between the samples, and hence the reflectance characteristics of the grating, may be adjusted by controlling the temperature of the sections.

In yet a further aspect, the second material is a material whose refractive index is dependent on applied electric field.

According to a further aspect of the present invention there is provided a method of compensating for dispersion in an optical signal having a bandwidth, the method comprising the steps of: inputting the signal to a waveguide comprising a chirped sampled Bragg grating extending along a length of the waveguide, the chirped sampled Bragg grating exhibiting a comb-like reflectance versus wavelength spectrum comprising a plurality of teeth; shifting the position of said teeth in the reflectance spectrum by adjusting the effective refractive index of the waveguide along at least a portion of said length, such that one of said teeth spans said bandwidth; and reflecting the optical signal from the chirped sampled Bragg grating.

Preferably, the shifting is achieved by adjusting the effective refractive index at a plurality of positions along the length, preferably by the same amount so as to increase or decrease the average effective refractive index along the length. Preferably each position lies between a respective pair of adjacent samples of the sampled Bragg grating.

Preferably, the shifting is achieved by altering the temperature or the electric field applied to portions of the waveguide between each pair of adjacent grating samples.

Preferably the method further comprises the step of altering the dispersion exhibited by the waveguide by adjusting the effective refractive index of the waveguide along at least part of its length so as to set a desired variation in effective refractive index over that length.

This effective refractive index "profile" may be achieved by applying a continuous variation in effective refractive index over the length, or by controlling refractive index at a plurality of distinct positions along the length. These separate positions are preferably located between adjacent grating samples.

The desired distribution of effective refractive index along the length may be achieved by controlling the temperature of or the electric field applied to sections of the waveguide distributed along its length.

According to a further aspect of the present invention there is provided a method of compensating for dispersion in an optical signal having a bandwidth, the method comprising the steps of: inputting the signal to a waveguide comprising a sampled Bragg grating extending along a length of the waveguide, the sampled Bragg grating exhibiting a comb-like reflectance versus wavelength spectrum comprising a plurality of teeth; chirping the sampled Bragg grating by adjusting the effective refractive index of the waveguide at a plurality of position along said length to set a variation in effective refractive index along said length; shifting the positions of said teeth in the reflectance spectrum by further adjusting the effective refractive index at said plurality of positions, such that one of said teeth spans said bandwidth; and reflecting the optical signal from the chirped, sampled Bragg grating.

Thus, in this aspect, the sampled Bragg grating may initially be unchirped, with all of the chirp for dispersion compensation purposes being provided by the applied effective refractive index variation along the length of the waveguide.

According to a further aspect of the present invention there is provided a method of compensating for dispersion in an optical signal being a bandwidth, the method comprising the steps of: inputting the signal to a waveguide comprising a chirped sampled Bragg grating extending along a length of the waveguide, the chirped sampled Bragg grating exhibiting a comb-like reflectance versus wavelength spectrum comprising a plurality of teeth; controlling the profile of the waveguide's effective refractive index along said length to adjust the position of the teeth in the spectrum to bring one of the teeth into register with the signal bandwidth to reflect the signal, and to adjust the dispersion imported to the signal by said reflection.

Further aspects of the present invention provide adjustable filters, line amplifiers, and receivers for WDM optical communications systems incorporating waveguides with sampled Bragg gratings in which effective refractive index can be controlled over the grating's length.

Further aspects are defined in the claims.

Other features and advantages of the invention will be readily apparent from the description of the preferred embodiments of the invention, from the drawings and from the claims.

DETAILED DESCRIPTION OF SPECIFIC EMBODIMENTS

Figure 1:
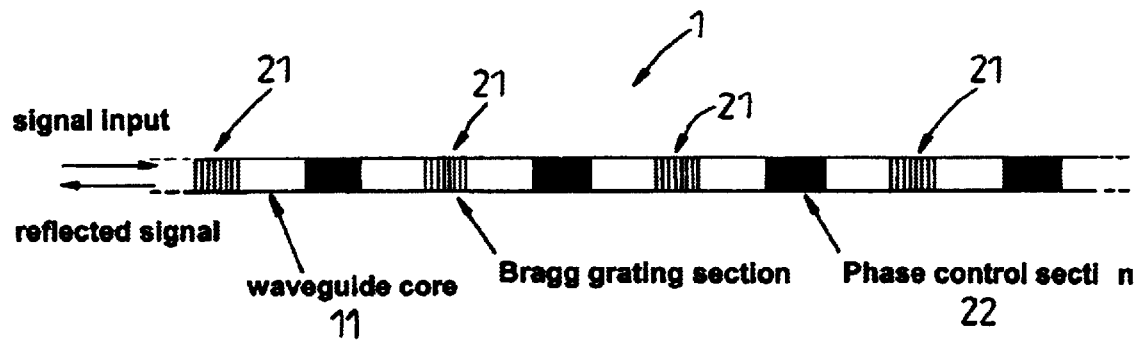
FIG. 1 shows a schematic of a sampled grating embodying the present invention.

FIG. 1 shows a section of a waveguide 1 embodying the invention, which preferably is single moded at wavelength of operation. At regular intervals along the waveguide, the effective index of the guide is modulated to form a Bragg grating. The modulation may be achieved by a varying the refractive index of the core, the refractive index of the cladding, the core transverse dimensions or the shape of the core cross-section. The sampled Bragg grating comprises a sequence of grating sections (samples) 21 spaced out at substantially regular intervals along the waveguide core 11.

In a preferred implementation, regions of high refractive index material are embedded in either or both of the core or cladding of the waveguide. The strength of each of the grating sections 21 is varied by adjusting the refractive index, volume or shape of the deposited material. It may be advantageous to apply a smooth variation in grating pitch along the device.

The waveguide also contains sections in which the effective index of the guided mode may be varied by some means. In FIG. 1 these are the "phase control sections" 22.

In a preferred implementation, transverse slots are cut into the waveguide, and filled with a material such as a polymer with a higher temperature coefficient of refractive index than silica, or a liquid crystal or other material whose refractive index may be varied by an applied electric field.

The wavelength, $\lambda_B$, of peak reflectance of a Bragg grating is determined by the pitch $\Lambda$ of the refractive index modulation, i.e. by $$\lambda_B = 2n_{eff} \Lambda$$

where $n_{eff}$ is the effective index of the mode, usually intermediate between the refractive indices of the core and cladding materials for a guided mode.

For dispersion compensator devices, and more generally for filters to be used in wavelength division multiplexed (WDM) systems, it is desirable that the reflectance of the filter is high and uniform in the pass band, and decays rapidly outside the passband. This minimises distortion of the wanted signal, and interference from unwanted signals at other wavelengths.

A means to achieve these characteristics in distributed Bragg grating filters is described in U.S. Pat. No. 5,717,799. For the applications described here, we also require that the group delay varies approximately linearly with optical wavelength within the pass band. This can be achieved by arranging for a substantially linear variation of Bragg wavelength with distance, in the centre of the device, and a smooth reduction in both the grating strength and the chirp rate at the ends of the device. The strength of the grating (coupling coefficient k) and the chirp rate of the grating h are varied together so that the reflectance of the grating is substantially constant across the pass band. To a first approximation, this is achieved by maintaining a constant value for the quantity $$R = \frac{k^2 \lambda}{2h}$$

There are other means to achieve the required performance, but this approach is simple, does not impose particularly stringent requirements on the fabrication process, and has been used with success in examples described herein.

Figure 2:
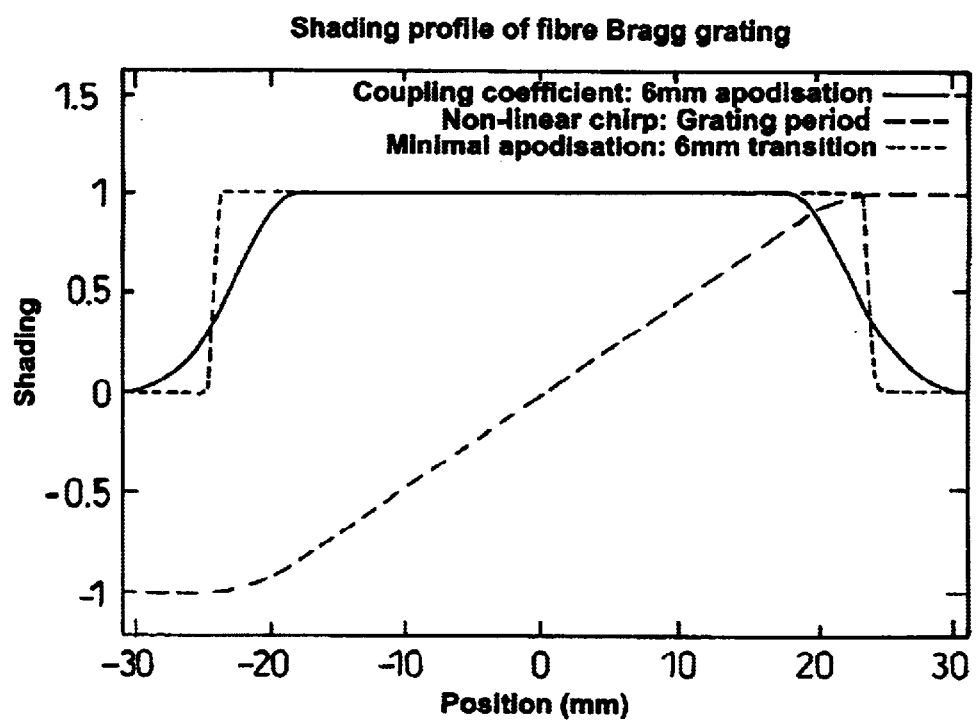
FIG. 2 shows apodisation and chirp profiles for a 60 mm DCG with non-linear chirp.
Figure 3:
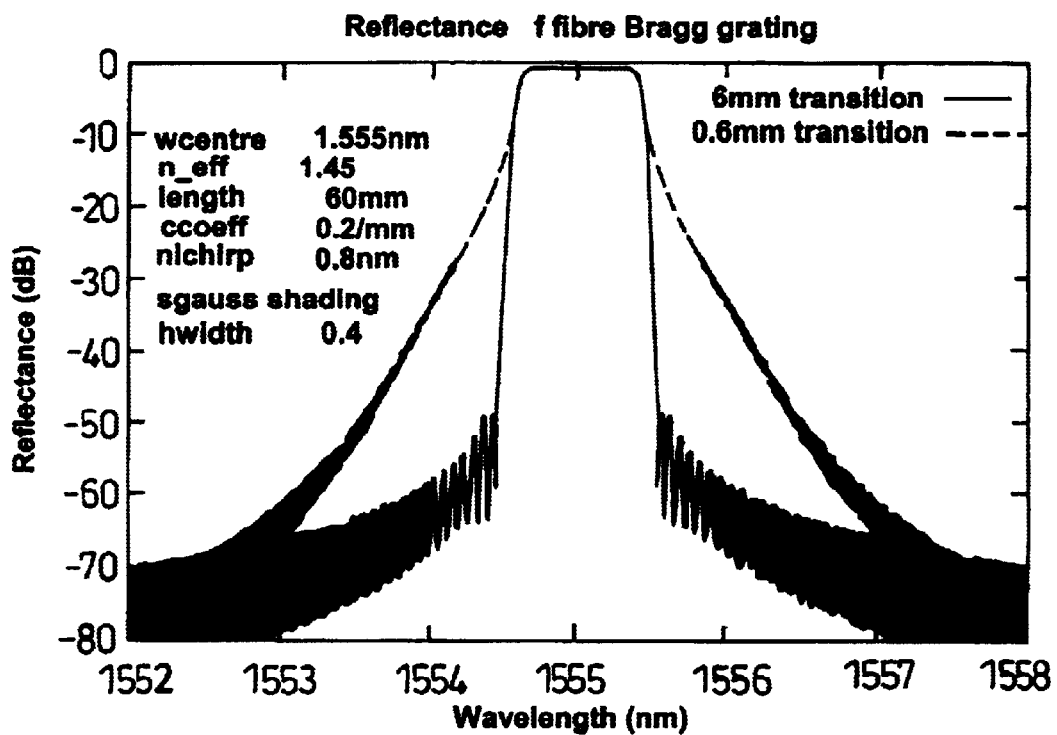
FIG. 3 shows comparison of reflectance spectra for chirped gratings with 6 mm and 0.6 mm end apodisation.

The benefits of a smooth apodisation of the grating is illustrated in FIGS. 2 and 3.

FIG. 2 shows two apodisation profiles for a 60 mm long device. With a rapidly changing grating strength (0.6 mm transition from low to high coupling strength), we see a rather slow decay of the reflectance outside the pass band for the dashed line in FIG. 3. With a smoother 6 mm transition, and the complementary chirp profile shown dashed in FIG. 2, where is a rapid decay of the reflectance to below −50 dB.

Figure 4:
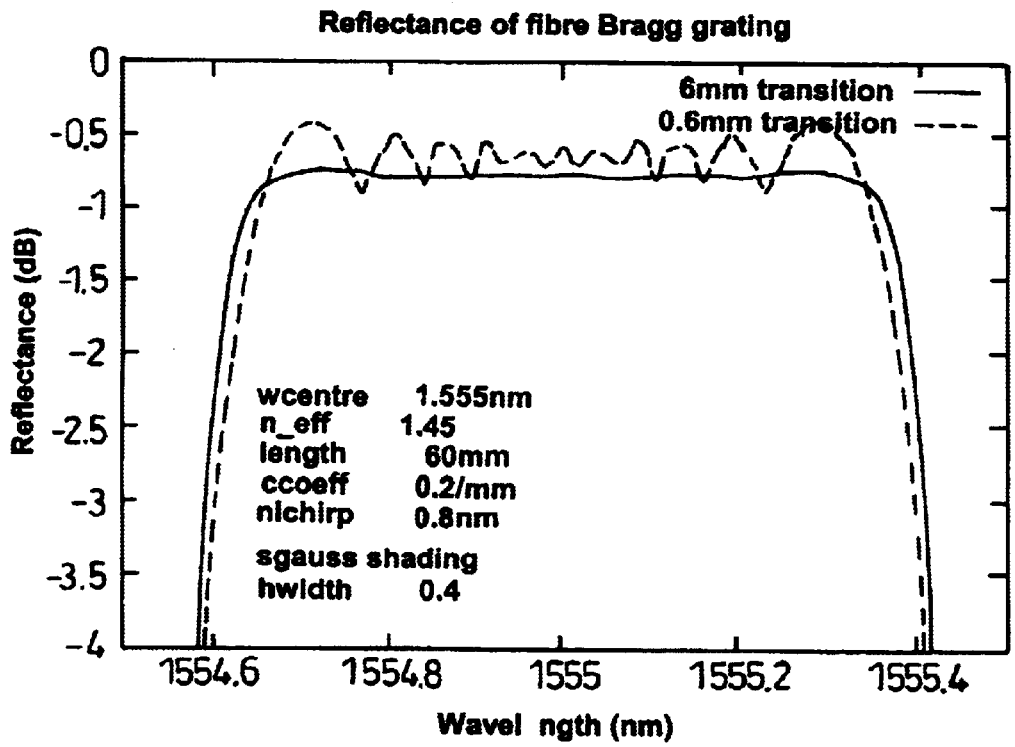
FIG. 4 shows the pass band ripple resulting from rapid change in coupling at end of grating.
Figure 5:
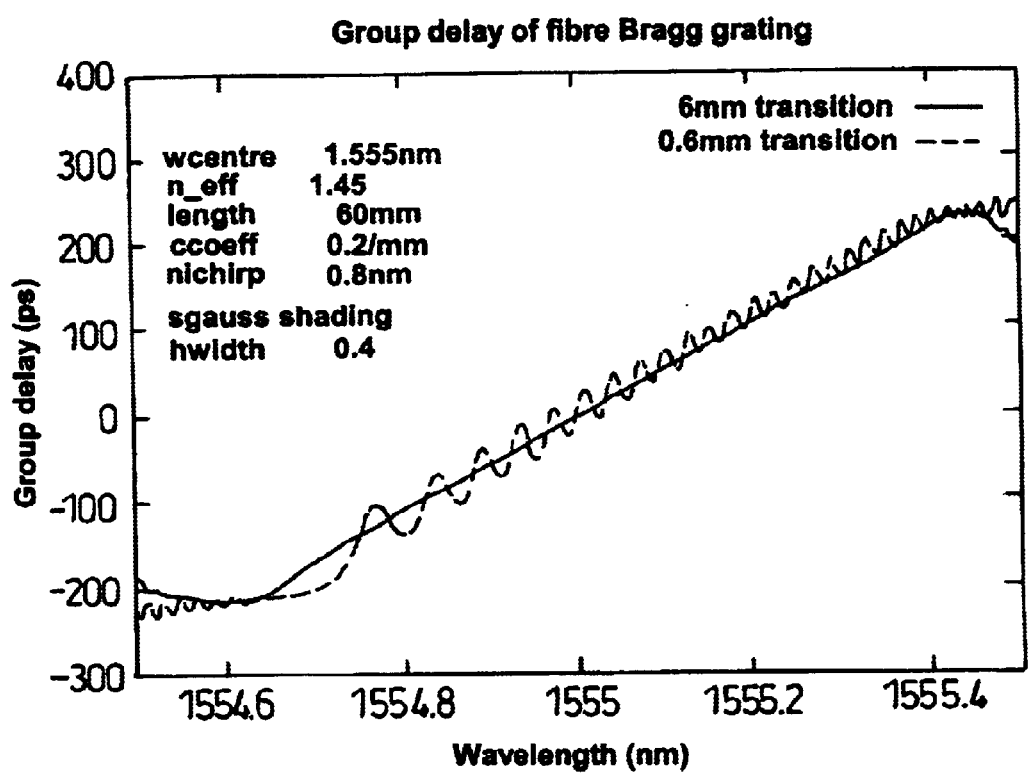
FIG. 5 shows the group delay ripple resulting from rapid change in coupling at the end of the grating.

FIG. 4 shows the additional benefits of smooth apodisation, in reducing amplitude ripple within the passband. FIG. 5 shows the associated improvement in group delay ripple. Dispersion in the centre of the band is approximately 550 ps/nm.

For the continuous grating shown in FIG. 2, there is a single high reflectance band centred on the Bragg wavelength at the middle of the chirped grating. The strength of this grating is relatively low. For a sinusoidal index modulation, the coupling coefficient k is related to the peak-to-peak variation in the effective index by:

$$k = \frac{\pi \Delta n_{pp}}{2\lambda_B}$$

In the sampled gratings described herein, we periodically increase the strength of the grating in short section of the waveguide, and reduce the strength close to zero elsewhere. The strength of the grating sections is increased in inverse proportion to the fraction of the waveguide they occupy, so that the path-averaged grating strength remains constant. Under these conditions, the pass band characteristics described in FIGS. 2–4 are largely unchanged, but additional reflectance bands arise, separated in optical frequency by $$\Delta f_{FSR} = \frac{c}{2nD}$$

where c is the velocity of light in vacuo, n is the effective index of the mode, and D is the spatial period between grating sections. For D=0.129 mm, n=1.45, the free spectral range is 800 GHz.

Figure 6:
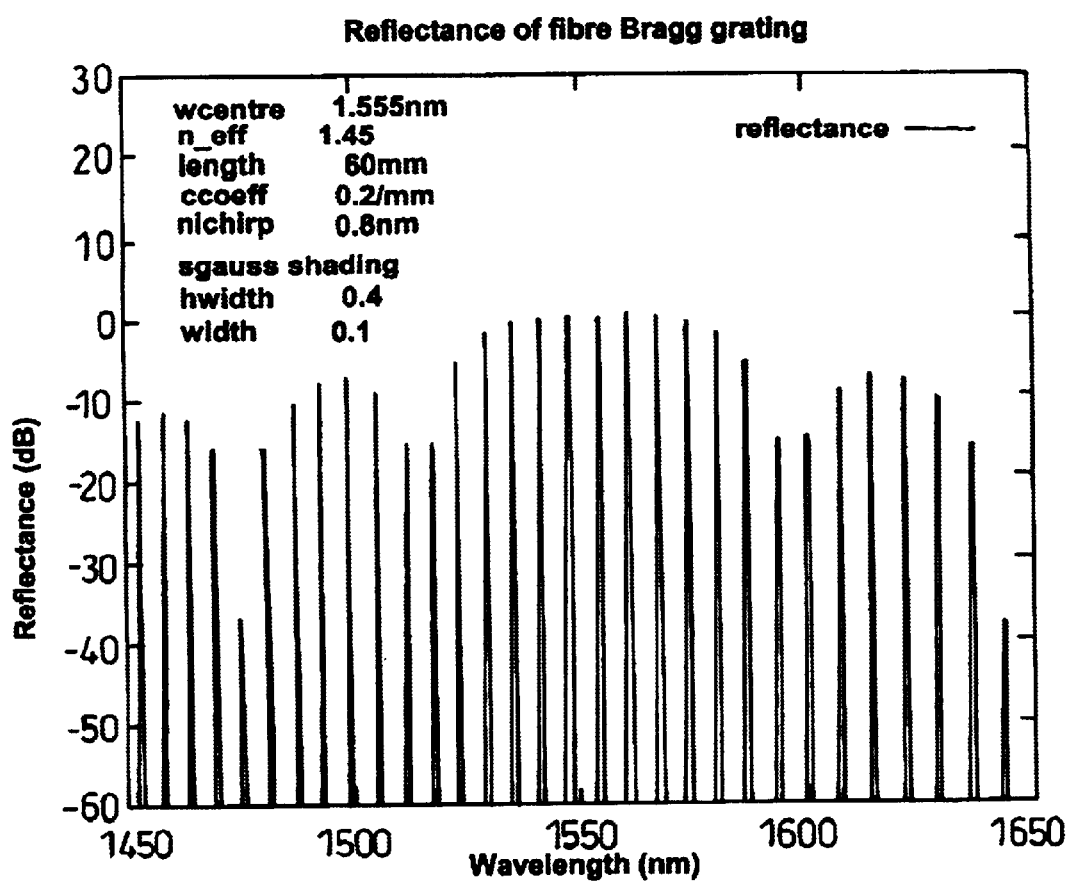
FIG. 6 shows the broad band comb spectrum of a sampled grating used in embodiments of the present invention.

FIG. 6 shows a typical result for a sampling period of 0.129 mm. For large frequency offsets from the 1555 nm centre wavelength, there is a reduction in efficiency, with a null in the response when $$\Delta f_N = \frac{mc}{2nw}$$

where w is the width of the grating regions, and m=(1, 2, . . . ) is an integer. For the example shown in FIG. 6, w=0.01 mm.

Figure 7:
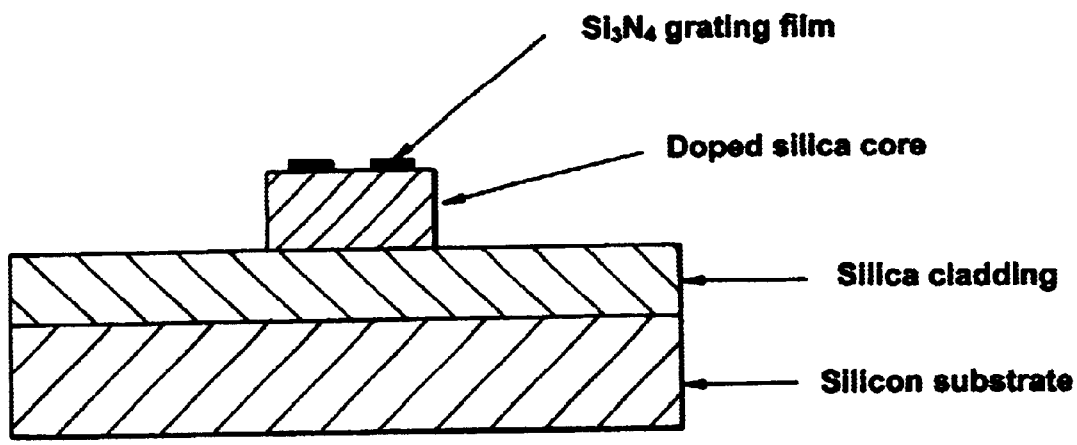
FIG. 7 shows a cross section of a waveguide embodying the invention, part way through the manufacturing process.
Figure 8:
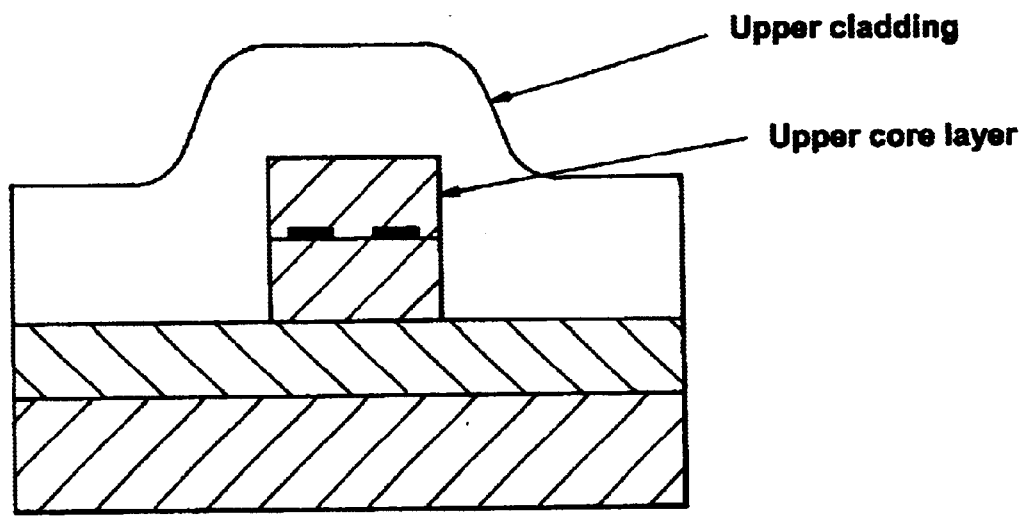
FIG. 8 shows a cross section of completed waveguide embodying the invention.

FIGS. 7 and 8 show a preferred manufacturing route, using silica on silicon planar waveguide techniques for manufacturing a waveguide embodying the present invention. Layers of glass of appropriate refractive index and thermal properties are deposited, and etched in sequence to give the required waveguide structure.

Silicon nitride has a high refractive index compared with silica, and provides the required index modulation for the grating regions, even when deposited as a relatively thin film. Thin films of silicon nitride can be etched to the required shape with high accuracy. FIGS. 7 and 8 show areas of $Si_3N_4$ positioned within the core of a planar waveguide.

$Si_3N_4$ regions located above and/or below the core will also provide the required index modulation, as will regions laterally displaced in the cladding. Such arrangements are used in alternative embodiments.

Modulation of the core width, thickness, or refractive index, are also possible, but may not provide as wide a range of performance as the silicon nitride approach.

The upper cladding shown in FIG. 8 may be either a glass or a polymer layer with a refractive index lower than that of the core glass.

With regard to tuning of the waveguide reflectance (including dispersion) characteristics the simplest option is to over-clad a ridge waveguide using a polymeric or similar material with a lower refractive index than the core material, and a high temperature coefficient of refractive index. This will provide the required variation of effective index as the temperature and temperature gradient along the guide are varied.

A possible side-effect is a variation of the strength of the grating as the cladding index varies. An increase in cladding index will decrease the fraction of power within the core, and reduce the overlap between the fibre mode and a grating written in the core. Such effects are minimised by operating with a relatively high index difference in the core (0.01 or larger), and/or by extending the index modulation outside the core.

Such variations in mode overlap are reduced if the variable refractive index material is located in slots in the waveguide, i.e. this is preferable to overcladding.

Figure 9:
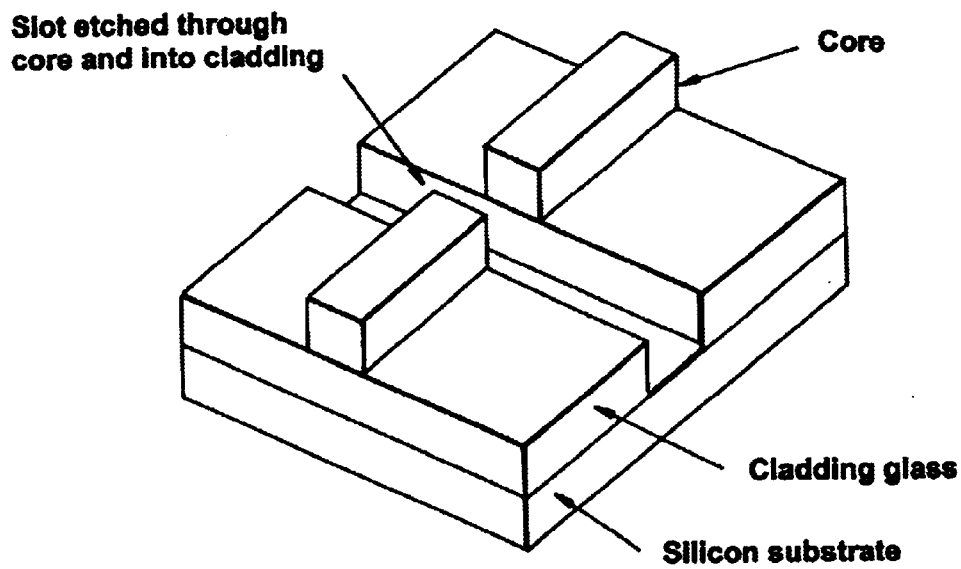
FIG. 9 shows a ridge waveguide embodying the invention.

FIG. 9 shows a ridge waveguide with slots etched transversely through the core (and preferably at least part way into the cladding, though this is not essential).

Figure 10:
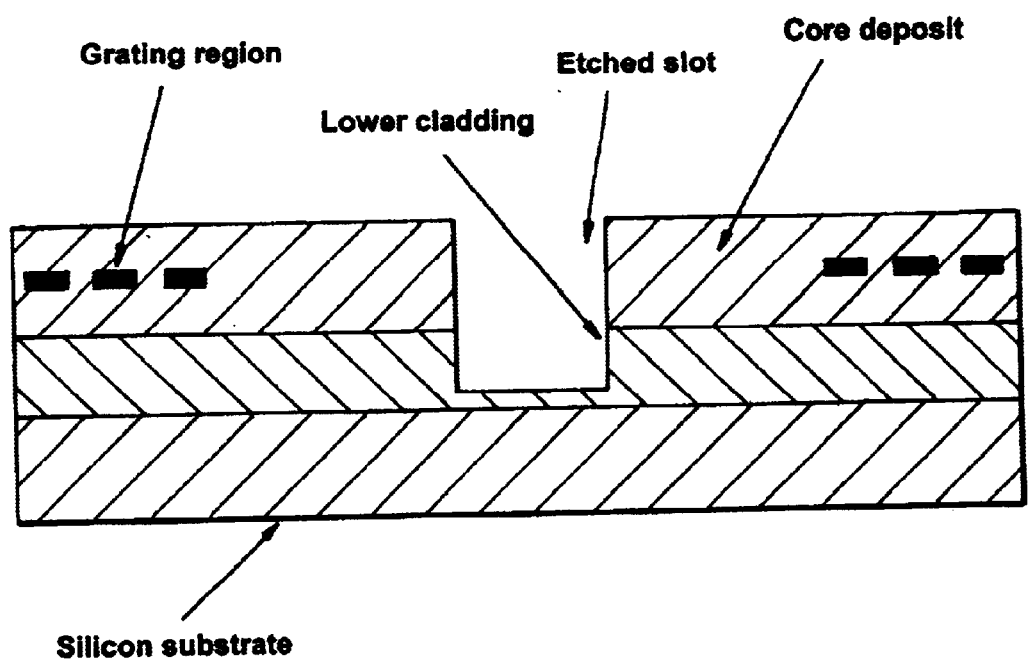
FIG. 10 shows a cross section of the waveguide shown in FIG. 9.

FIG. 10 is a cross-section through such an etched waveguide.

There is potential for power to be radiated out of the guide if the slots are too wide. The magnitude of the loss depends on the waveguide properties (such as mode field diameter) and on the width of the slot. For typical waveguides, slots widths of 10 μm will give acceptable performance.

Figure 11:
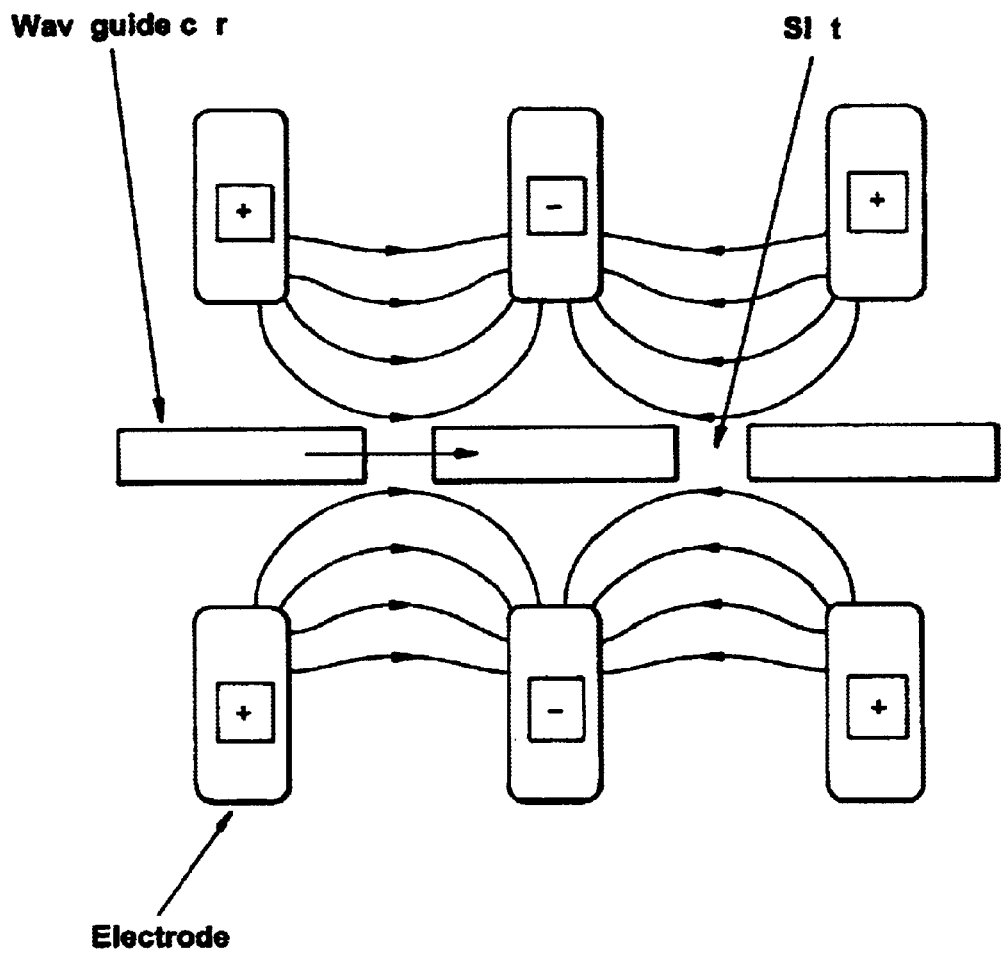
FIG. 11 shows a dispersion compensator with electric tuning, embodying the invention, the electrode arrangement producing an electric field in the slots which is substantially parallel to the propagation direction within the waveguide.

Electro-optic tuning is a further tuning option, and can provide a fast response. Suitable materials are available whose refractive index varies with applied electric field. Liquid crystal materials are examples with relatively large refractive index changes for small applied electric fields. FIG. 11 shows an example of a slotted waveguide and an arrangement of electrodes which gives a substantially axial electric field in the slots, which contain a suitable electro-optic material. This arrangement is employed in a dispersion compensator embodying the invention.

The applied electric field makes the electro-optic material birefringent. The polarisation dependence for an optical signal propagating in the waveguide is small when the electric field is parallel to the direction of propagation. An alternative disposition of electrodes is possible with certain classes of optical anisotropy in the electro-optic material.

Temperature tuning is a further option, used in certain embodiments. One option used for temperature tuning is to deposit heating elements on the silica on silicon waveguide, close to the waveguide.

For a planar waveguide dispersion compensator embodying the invention, the temperature gradients required to achieve a useful tuning range are relatively low. An alternative method is to heat or cool the waveguide structure using a number of Peltier devices.

Figure 12:
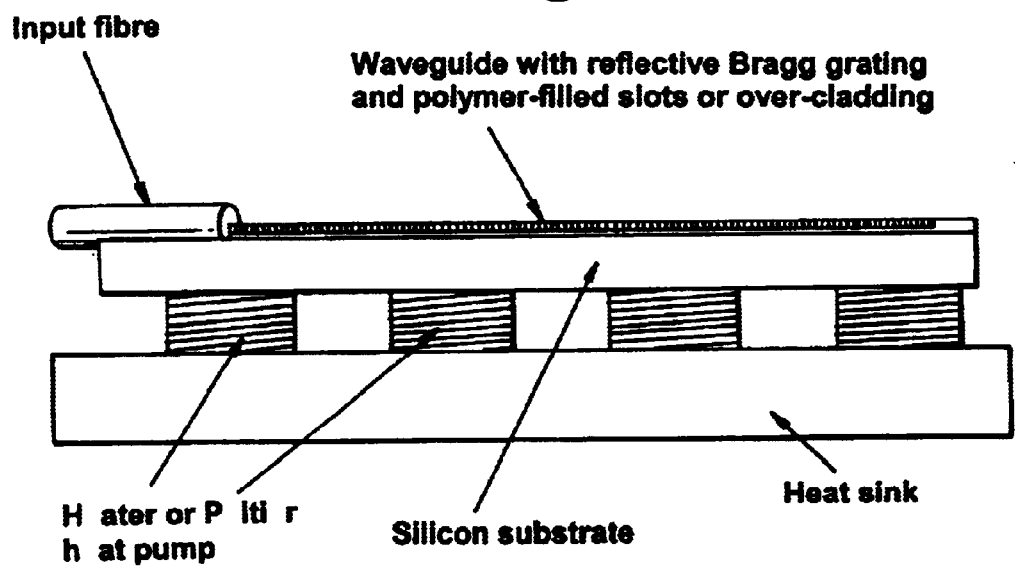
FIG. 12 shows an adjustable dispersion device embodying the invention.

FIG. 12 shows one configuration. The response time of such a device will be slower than for the case where heaters are located within a few tens of microns of the waveguide core, but with appropriate thermal design, the power consumption could be lower.

Polarisation effects will now be addressed.

An aspect of design of Bragg gratings for dispersion compensation applications that requires care is waveguide birefringence. Relatively small levels of waveguide birefringence can result in high levels of differential group delay (DGD) between orthogonally polarised input signals.

It will be difficult to fabricate waveguide gratings with sufficiently low birefringence to avoid such problems directly. However, planar waveguide techniques can fabricate substantially identical waveguides on the same wafer.

One method of reducing the impact of DGD is to separate the input signal into orthogonal polarisation states, and process both states separately in identical waveguides. This is described in U.S. Pat. No. 5,974,206.

An alternative method is to use two identical waveguide Bragg gratings in series. The output polarisation state from the first waveguide is rotated through 90 degrees before transmission through the second waveguide Bragg grating. Both polarisation states are reflected via the slow axis of one waveguide grating, and via the fast axis of the identical second grating, minimising any differential group delay between the two polarisation states.

The polarisation rotation may be implemented using waveplates operating on an expanded beam, or by using polarisation maintaining fibre, with a 90 degree twist between the two devices, or by insertion of this film waveplates in narrow slots (typically 10 μm or less in width).

Figure 13:
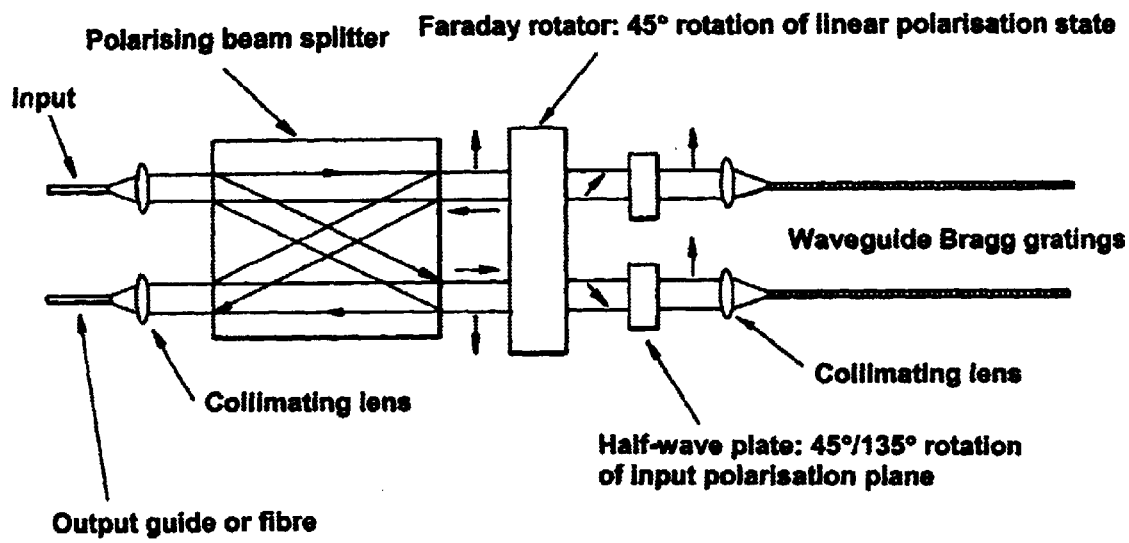
FIG. 13 shows a polarisation insensitive configuration of dispersion compensator, as described in U.S. Pat. No. 5,974,206.
Figure 14:
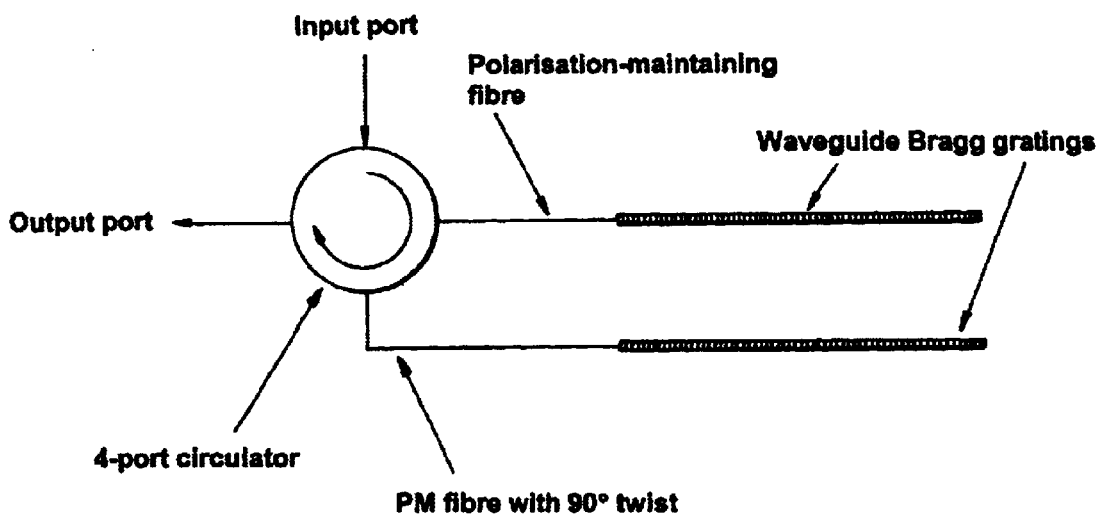
FIG. 14 shows a four-port circulator, dual grating configuration of a dispersion compensator.

FIG. 14 shows an example of this configuration. Because of the additional circulator stage, and Bragg reflection, the insertion loss may be higher than for the method shown in FIG. 13. However because each polarisation is reflected from both Bragg gratings, the dispersion is twice that achievable from a single reflection, assuming identical waveguide length, chirp rate, and bandwidth.

An alternative implementation would use expanded beams, polarising beam splitters, and wave plates to rotate the polarisation states, similar to the techniques used in isolators, circulators, and in FIG. 13.

One aspect of the present invention is directed to a method of manufacturing sampled dispersion compensation gratings with a periodic passband response. The design is implemented in a planar waveguide technology. Use of a polymer cladding or polymer-filled waveguide slots enables electrical or thermal tuning of both dispersion and dispersion slope, over a broader range than is practical in a device relying entirely on silica-based glasses in the signal path.

High bit rate wavelength division multiplexed (WDM) optical communications systems, operating at 40 Gbit/s and higher rates, require per-channel dispersion compensation. If second order dispersion (dispersion slope) is sufficiently high, then pulse distortion occurs, and compensation for dispersion slope improves performance. Embodiments of the present invention provide such compensation.

Sampled gratings can be manufactured in silica fibre. However using UV written, photo-induced gratings with the grating pitch defined by a phase mask, it is difficult to achieve the required spatial resolution for the reflecting elements. Certain embodiments of the present invention provide sampled gratings implemented in planar waveguide structures. The grating elements may be deposited in or on a core of the waveguide and provide the required spatial resolution.

In preferred embodiments, instead of a continuous Bragg grating, the device is fabricated as a series of short sections. For a device operating in the 1550 nm region, an overall spectral width (at −1 dB insertion loss) of 30 nm is possible with a section length of 0.01 mm. Narrower reflecting regions will give a broader spectral response, but will require a higher index modulation in the grating. This is possible using the technique described. In a silica-based glass, a sample repeat period of 0.26 mm gives a free spectral range of 400 GHz. 0.13 mm gives an 800 GHz FSR. Thermal tuning may be provided by manufacturing the upper cladding layer of the waveguide from a polymer, or other material, preferably with a higher temperature coefficient of refraction than silica. Silicone-based polymers are available with suitable refractive index values, but other materials may be used. Alternatively, slots of 0.002 to 0.02 mm width may be cut or etched in the waveguide, between the grating sections, and filled with a suitable polymer. This allows the average refractive index of the waveguide to be adjusted, by changing the temperature. The constraints on the absolute refractive index of the material are less stringent than for the over-clad option. Some liquid crystal materials exhibit a refractive index which varies with electric field. These may either be used as cladding materials, or in the filled slot configuration. Similar materials such as polymer dispersed liquid crystals are also suitable. The pass band response of the filter is controlled by the overall length, chirp and apodisation of the sampled grating. A length of 60 mm is readily fabricated on a silicon wafer without bends. This is ample to provide up to 600 ps/nm dispersion over a 0.5 nm spectral window. The grating chirp, and hence the dispersion, is tuned by inducing a temperature gradient along the grating. With typical material and device parameters, 50 degrees difference along the grating is sufficient to change the dispersion from 550 ps/nm to 80 ps/nm. A smaller temperature range may be adequate for many applications, and will reduce power consumption, and minimise variations in insertion loss. Dispersion slope is provided by making the temperature gradient vary with position. 50 ps/nm/nm/km dispersion slope is achievable over 1 nm bandwidth. Much higher slopes are possible over a narrow window.

Embodiments provide per-channel dispersion compensation, required for high capacity transport systems, operating at 40 Gbit/s. The periodic pass band allows a single compensator unit to be suitable for any one of a range of WDM channels, reducing parts count, inventory and cost. It allows receiver modules to be generic, rather than channel specific. At 80 Gbit/s dispersion slope compensation may be required.

Thus it will be apparent that in embodiments of the present invention a comb filter spectral characteristic is provided by a sampled Bragg fibre grating. The optical path length extending between each adjacent pair of grating samples is adjustable using a high (thermal or electric field) coefficient material to load the waveguide, or to fill transverse slots milled in the waveguide core. A uniform magnitude of adjustment serves to shift the spectral position of the teeth so that one of them can be brought into registry with any chosen WDM channel lying within the spectral band covered by the comb. A superimposed linearly graded adjustment along the length of the sampled grating then adjusts the magnitude of the dispersion afforded to that channel. Thus different gratings of the same design can be employed for dispersion compensation of different WDM channels. (If designed, a quadratic grating can be further superimposed on the linear grading).

In embodiments of the present invention it is not essential that all the sample widths and separations are identical, although random deviations from the simple case are likely to degrade the performance. Modulating the period, width and strength can be used to modify the transmission performance.

Certain illustrations show a "top hat" modulation. This is for simplicity of simulation and visualisation, and is not essential. With some fabrication techniques, it will not be possible to achieve a sharp cut-off. This is not necessarily a problem, and may be desirable if a smooth roll-off of the transmission of the outer pass bands is required. Using the described lithographic technique, this is available as a design parameter. In such cases we need not include an exact integer number of grating periods.

The rate of chirp in preferred embodiments will generally be relatively slow, so the number of grating periods will not change significantly along the grating. We also have the option to maintain the physical pitch of the grating and the sampling period and duty cycle precisely constant, and to introduce the chirp by changing the mean refractive index of the waveguide between each grating section.

It will be apparent that certain aspects of the present invention provide an adjustable planar waveguide dispersion compensator.

Key features of embodiments of the invention are:

Sampled Bragg gratings give a periodic pass-band response, so a single device according to the present invention can be used over a wide range of wavelengths.

Bragg grating chirp rate and effective pitch may be varied by adjusting the temperature or electric field applied to polymer-filled slots in the waveguide.

Centre wavelength of the pass-band of the grating may be adjusted by varying the mean index of the polymer.

Dispersion may be adjusted by varying the chirp rate, e.g. by a field or temperature gradient.

Dispersion slope may be compensated by applying a non-uniform field or temperature gradient.

Preferably, the sampled gratings utilised in embodiments of the present invention have one or more of the following preferred features:

Low duty cycle, i.e. the grating samples (grating regions) are narrow, separated by longer sections of unmodulated waveguide. Such an arrangement is required to achieve a wide operating window with a useful number of duplicated pass-bands (i.e. a useful number of duplicated reflection teeth).

High sampling contrast, i.e. there is low reflectance between grating sections. This is required for uniform reflectance between different orders of pass-band.

Sampled grating with high index modulation in the grating sections. This is required for low insertion loss from relatively shortly waveguide devices.

Useful devices can still be fabricated if some of these preferences are not fully met, but aspects of performance, such as insertion loss uniformity between pass-bands, or the useable operating wavelength range, may be compromised.

In a preferred implementation, the waveguide has a planar waveguide structure. Preferably the grating elements are formed by depositing silicon nitride in the centre of the waveguide (e.g. in the centre of the core). Alternatively, the silicon nitride ($Si_3N_4$) deposits can be made above and/or the waveguide core. Preferably, slots are etched into the waveguide structure, to be filled by suitable materials such as a polymer.

It will be apparent that the gratings used by embodiments of the present invention may be manufactured in any one of a large number of ways. For example, the grating elements may be formed by modulating the core thickness, by modulating the core width, or by modulating the core composition (for example by ion implantation, in-diffused, or deposited dopants).

Further ways of producing the grating elements are, of course, to deposit lines or other structures of suitable material in or on or under the waveguide core. Other methods of producing a sampled Bragg grating will be well known to those skilled in the art.

Preferably, the gratings utilised by embodiments of the present invention are apodised, i.e. the coupling strength is apodised, and the chirp at the ends of the grating is varied to minimise delay ripple, among other things.

The cladding refractive index may be temperature tuned to vary the coupling strength with chirp. Also, dispersion slope may be adjusted by appropriate control of refractive index profile along the length of the grating.

It will be apparent that another way of considering a waveguide comprising a sampled Bragg grating is that it is a waveguide with a periodic modulation of the refractive index or waveguide geometry. The depth of the periodic modulation is itself modulated, so that the waveguide comprises short Bragg grating segments, separated by substantially unmodulated sections. In preferred embodiments of the invention, means are provided to vary the effective refractive index of the unmodulated segments of the waveguide.

Preferably the unmodulated sections of the waveguide include parts which are constructed from material whose refractive index may be controlled by an applied electric field. Alternatively, those parts may be constructed from a material with a high temperature coefficient of refractive index.

In other embodiments, part of the optical cladding to the waveguide comprises a material with lower refractive index than the waveguide core, and which has a high temperature coefficient refractive index.

In alternative embodiments, part of the optical cladding to the waveguide comprises a material with a lower refractive index and the waveguide core, and whose refractive index may be modified by an applied electric field.

It will be appreciated that by increasing the average temperature along the length of a sampled Bragg grating, as well as shifting the positions of the teeth in the comb-like reflectance spectra, the width of each tooth is also affected. Typically, increasing the average temperature will result in a broadening of each tooth. In embodiments of the present invention which include slots arranged between adjacent grating samples, the centre frequency of the pass-band can be adjusted within the free spectral range by changing the mean index of the tuning slots (i.e. the mean temperature of the device).

In preferred embodiments, the dispersion compensation device is fabricated from a sequence of grating sections, separated by uniform index regions containing one or more slots in the waveguide. These waveguide slots are filled with material whose refractive index is close to that of the waveguide, but whose precise value can be modified, for example by changing the temperature, or applying an electric field.

To a first approximation, the dispersion is inversely proportional to the chirp rate of that part of the grating where the Bragg condition for the input wavelength is satisfied. It follows that we can change the dispersion slope within the pass-band by changing the temperature gradient appropriately.

The present invention finds application in multi-span dispersion-managed links.

In the absence of fibre non-linearity, system performance is not sensitive to the distribution of dispersion compensation along the link. All that matters is that the net dispersion from transmitter to receiver is sufficiently small. In practical WDM systems, the Kerr effect induces phase distortion which interacts in a complex fashion with the chromatic dispersion. For systems employing return to zero (RZ) modulation, distortion of individual channels is minimised by arranging for periodic dispersion compensation at each line amplifier site, such that the dispersion of the preceding span is almost completely compensated, and neighbouring pulses do not overlap appreciably at the outputs of the line amplifiers, where signal powers are highest.

In contrast, cross phase modulation (XPM) between different channels is reduced when the individual pulses are broadened, reducing the rate of change of power with time in the interfering waveforms. Furthermore, there is a degradation in performance when the dispersion of each fibre span is exactly compensated at each line amplifier site. In this case the co-propagating signal waveforms are brought into exact temporal alignment at the locations where the induced cross talk is greatest. Under these conditions, the XPM-induced penalties add coherently, and the net penalty increases linearly with the number of spans, causing a substantially higher penalty than occurs with incomplete compensation of each span.

Current practice is to manage the dispersion compensation at each line amplifier site so that there is a well-defined, finite net dispersion, over each compensated span. The net dispersion typically varies from span to span over the link, and is selected as a compromise between good single channel performance, and acceptably low WDM penalty. At high bit rates (40 Gbit/s and higher), the commissioning and provisioning procedure is complicated by the need for accurate in-situ measurements of the chromatic dispersion of the fibre, and the requirement to have available a selection of compensation modules covering the anticipated range of compensation values required.

Automated provisioning of the dispersion map is another feature of preferred embodiments.

Embodiments of the present invention provide dispersion compensation at multiple discrete wavelengths. By replacing, or supplementing, the per-span compensation module (typically located at each line amplifier site) with an adjustable compensation device as proposed here, it is no longer necessary to carry a large number of compensation modules of slightly different value. For low dispersion fibres, the DCM may be replaced entirely. For higher dispersion fibres, we select a fixed dispersion compensation module which, when combined with the present invention, allows the likely range of fibre dispersion values to be compensated by varying the dispersion of the adjustable compensator. This avoids the need to provide modules which will not be used, and allows the distribution of dispersion over the link to be automatically adjusted to meet the design dispersion profile.

Providing adjustable compensation at each line amplifier site offers an additional advantage in systems capable of monitoring the quality of the transmitted signal. For example, this may be by monitoring of the signal quality at a detector (e.g. eye opening, 'Q' measurement, or Nortel superdecoder pseudo-error rate), or from the number of errors corrected by forward error correction of the detected and demultiplexed signal. The dispersion compensation at each line site may be adjusted, the impact on the signal quality determined, and the adjustment repeated so as to optimise the performance of the transmitted signals.

Alternatively, the dispersion compensation may be adjusted according to pre-defined rules, to optimise performance as the system operating conditions are varied. Examples include adjusting the dispersion distribution as additional signal channels are provisioned, or providing the best compromise for dispersion compensation over different paths in wavelength routed networks.

Optimisation of single channel and WDM non-linear penalties in another area of interest.

The previous section describes how embodiments of the current invention simplify the provisioning and management of systems designed to work with fixed in-line dispersion compensation modules. The benefits apply to any adjustable compensation device which supports more than a single simultaneous wavelength. There are additional benefits arising from the specific dispersion characteristics of the invention, offering improvements in performance over what can be achieved in systems based on dispersion compensation fibre.

The system can be provisioned with close to full compensation, optimising the performance of an isolated channel. In RZ systems, best single channel performance is usually with a small positive dispersion, which just balances the chirp induced by self-phase modulations. When the ratio of pulse width to bit period is small, such systems are described as "dispersion managed soliton" systems.

Although the dispersion within each signal band is compensated, the periodic "sawtooth" dispersion characteristics do not compensate for the differential group velocity between co-propagating channels. Consequently, the WDM penalty induced by cross-phase modulation does not suffer from the coherent addition of phase modulation, which degrades performance in fibre compensated systems at close to 100% compensation.

Figure 15:
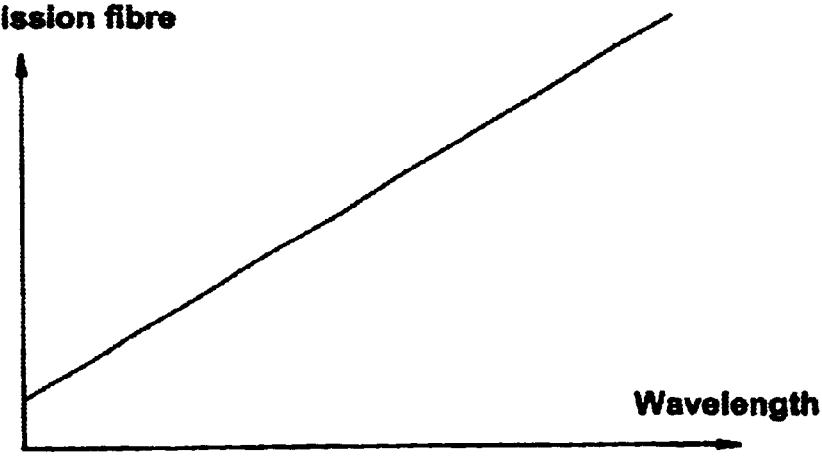
FIG. 15 shows the periodic dispersion vs. optical frequency (or wavelength) which gives a small change of group delay with wavelength within each pass band, but significant differential delay between pass bands.
Figure 15:
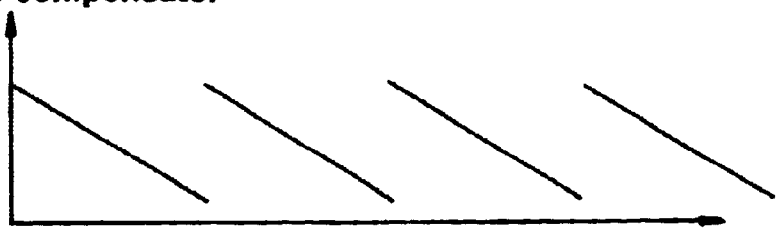
Figure 15:
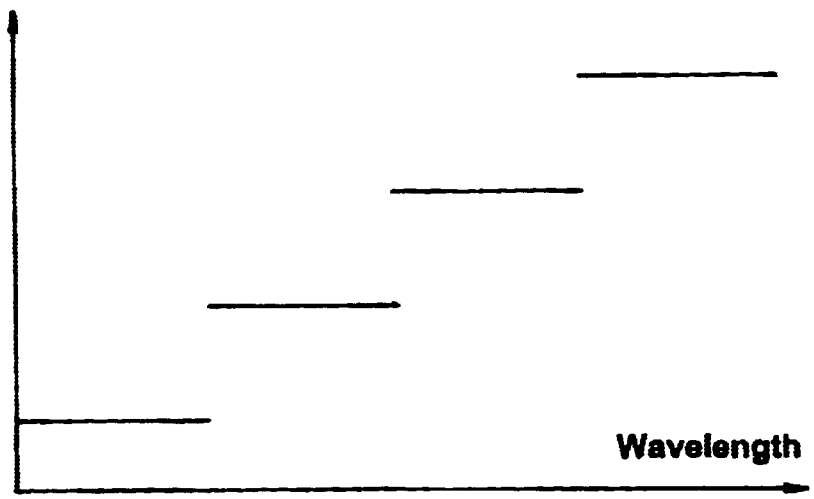

FIG. 15 shows the approximately linear variation of group delay with wavelength for a typical transmission fibre. The present invention provides a group delay variation with wavelength which is approximately equal in magnitude to that of a length of the fibre, and is opposite in sign. However the group delay does not change monotonically with wavelength outside the pass band. Instead, the response follows a "saw tooth" shape, with a period equal to the period of the reflectance pass bands.

When the group delays of fibre and compensator are combined, the group delay variations within each pass band are small, but there is a large net delay between pass bands.

Embodiments of the present invention are applicable to WDM system operation at high spectral density.

A feature of embodiments of the invention is that the width of the pass bands (the teeth of the comb-like response) increases as the rate of chirp is increased, and the dispersion is reduced. If the pass bands overlap, there is a possibility of multi-path interference (MPI) between different orders of reflection. As the overlap increases, then the wavelengths at which MPI occurs may extend into the modulation bandwidth of one or more of the signals. This will cause distortion of the signal.

By selecting an appropriate sampling period, the separation between pass bands can be designed so that significant overlap does not occur, or only occurs at wavelengths which are not used for transmission. This is not a problem for single channel applications, but means that for WDM compensation applications, parts of the spectrum are unavailable for transmission.

In WDM systems in which the information bandwidth is much smaller than the channel separation, this need not be a problem. For example, for 10 Gbit/s signals separated by 100 GHz the pass band could be designed to increase from 30 GHz to 60 GHz, giving a two-fold variation in device dispersion, and need not suffer from MPI.

At higher bit rates, modulation broadens the signal spectrum by a substantial fraction of the channel separation. For 40 Gbit/s modulation, we require low insertion loss over a bandwidth of typically 50–90 GHz, and the insertion loss requirements are more stringent for a device inserted at each line amplifier site, than for a single filter located at the receiver. Instead of using a single grating for all signal channels, we use an interleaved filter, which separates adjacent channels into two or more optical paths, each of which is compensated separately.

If the system carries signals at frequencies separated by 200 GHz, e.g. 193100 193300 193500 193700 193900 . . . GHz, then signals 193100, 193500, . . . are directed to one compensator, and the alternate channels 193300, 193700, . . . are directed to a second compensator, tuned to the intermediate signal frequencies.

Figure 16:
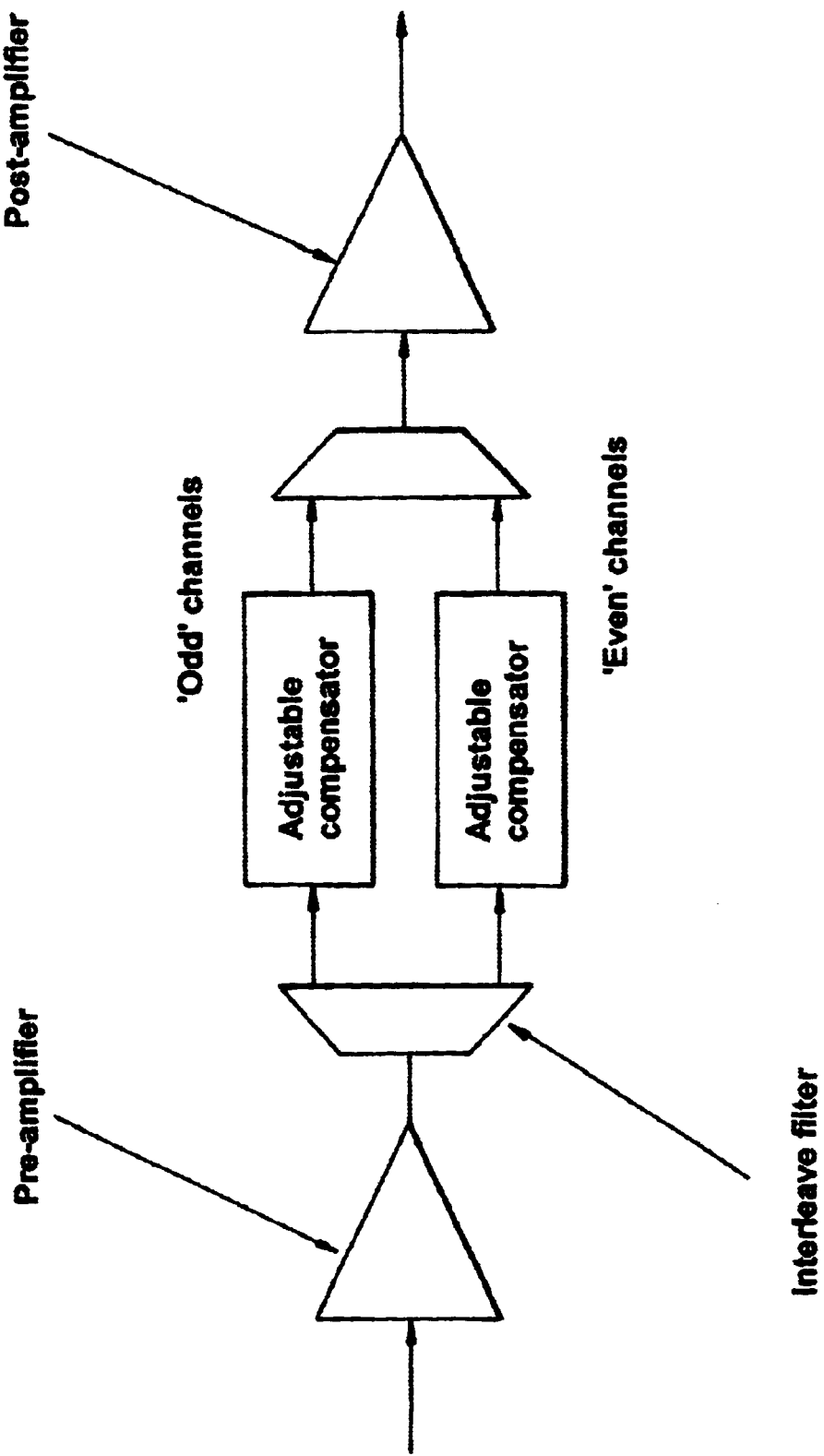
FIG. 16 shows a line amplifier, embodying the invention, with channel-interleaved adjustable periodic dispersion compensators for dense WDM systems.

FIG. 16 shows such an arrangement, with the interleave filter, compensators and re-combiner inserted between the pre-amplifier and post-amplifier stages of a line amplifier.

If the ratio of channel separation to modulation rate is very small (high spectral occupancy), or a particularly wide variation of dispersion compensation is required, then an interleave filter which separates the signal into a larger number of interleaved channels may be used.

What is claimed is:

1. Dispersion compensation apparatus comprising:
a waveguide comprising a sampled Bragg grating extending along a length of the waveguide, the sampled Bragg grating exhibiting a comb-like reflectance versus wavelength spectrum comprising a plurality of teeth, the waveguide comprising a core and a plurality of slots interrupting the core, said slots being spaced apart along said length of the waveguide; and
being filled with a material having a variable refractive index and
adjustment apparatus arranged to adjust an effective refractive index of the waveguide along at least a portion of said length.

2. Apparatus in accordance with claim 1, wherein the sampled Bragg grating is a chirped sampled Bragg grating.

3. Apparatus in accordance with claim 1 wherein the adjustment apparatus is arranged to shift the positions of said teeth in the spectrum, whereby one of the teeth may be brought into register with a bandwidth of a signal input to the waveguide.

4. Apparatus in accordance with claim 3, wherein the adjustment apparatus is arranged to control the average value of effective refractive index over said length.

5. Apparatus in accordance with claim 1, wherein the adjustment apparatus is adapted to set a desired distribution of effective refractive index along said length to control dispersion imparted to optical signals reflected by the grating.

6. Apparatus in accordance with claim 1, wherein the waveguide includes a cladding, the cladding being formed from material having a refractive index which is dependent on temperature, and the adjustment apparatus comprises a temperature controller arranged to control the average temperature of the cladding material over said length.

7. Apparatus in accordance with claim 6, wherein the temperature controller is further arranged to set a desired temperature distribution in the cladding over said length.

8. Apparatus in accordance with claim 1, wherein each slot is filled with a material having a temperature-dependent refractive index, and the adjustment apparatus comprises temperature control apparatus arranged to control the temperature of the material in each slot.

9. Apparatus in accordance with claim 1, wherein each slot is filled with a material having a refractive index that is dependent on applied electric field, and the adjustment apparatus comprises a plurality of electrodes and a controller arranged to control voltages applied to the electrodes, the electrodes and controller being arranged to apply a controllable electric field to the material in each slot.

10. Apparatus in accordance with claim 8 wherein each slot is arranged between a respective pair of adjacent samples of the grating.

11. Apparatus in accordance with claim 10 wherein a respective slot is arranged between each pair of adjacent samples.

12. Apparatus in accordance with claim 9 wherein each slot is arranged between a respective pair of adjacent samples of the grating.

13. Apparatus in accordance with claim 12 wherein a respective slot is arranged between each pair of adjacent samples.

14. Dispersion compensation apparatus in accordance with claim 1 and comprising a plurality of said waveguides integrated on a common substrate, each waveguide being arranged to reflect a respective one of a plurality of WDM signals, the adjustment apparatus being arranged to adjust an effective refractive index of each waveguide along at least a portion of said length.

15. A line amplifier for a WDM communications system comprising dispersion compensation apparatus in accordance with claim 14.

16. A node for a WDM communications network comprising dispersion compensation apparatus in accordance with claim 14.

17. A receiver for a WDM communications network comprising dispersion compensation apparatus in accordance with claim 14.

18. A line amplifier for a WDM communications system comprising a plurality of dispersion compensation devices, each device comprising apparatus in accordance with claim 1, arranged to compensate for dispersion in a respective one of the WDM signals.

19. A node for a WDM communications network comprising a plurality of dispersion compensation devices, each device comprising apparatus in accordance with claim 1, arranged to compensate for dispersion in a respective one of the WDM signals.

20. A receiver for a WDM communications network comprising a plurality of dispersion compensation devices, each device comprising apparatus in accordance with claim 1, arranged to compensate for dispersion in a respective one of the WDM signals.

21. An optical transmission system comprising a plurality of line amplifier sites, each site including one or more dispersion compensation devices, each device including dispersion compensation apparatus in accordance with claim 1.

22. A system in accordance with claim 21, wherein more than one signal of a plurality of WDM signals is dispersion-compensated by each dispersion compensation device.

23. A system in accordance with claim 22, wherein adjacent WDM signals are routed to different dispersion compensation devices.

24. Dispersion compensation apparatus comprising:
a waveguide comprising a sampled Bragg grating extending along a length of the waveguide, the sampled Bragg grating exhibiting a comb-like reflectance versus wavelength spectrum comprising a plurality of teeth, the waveguide comprising a core and a plurality of slots interrupting the core, said slots being spaced apart along said length of the waveguide and bring filled with a material having a variable refractive index; and
adjustment apparatus for controlling and adjusting an effective refractive index profile of the waveguide along said length.

25. Apparatus in accordance with claim 24, wherein the sampled Bragg grating is chirped.

26. A waveguide comprising:
a core formed from a first material;
a sampled Bragg grating comprising a sequence of grating samples spaced apart along said core; and
a plurality of waveguide sections comprising slots filled with a second material, each section at least partially interrupting the core and being arranged in the optical path between a respective pair of adjacent grating samples,
the second material having a higher thermal coefficient of refractive index than the first, whereby the optical path lengths between the samples, and hence the reflectance characteristics of the grating, pay be adjusted by controlling the temperature of the sections.

27. Dispersion compensation apparatus comprising a waveguide in accordance with claim 26.

28. A waveguide comprising:
a core formed from a first material;
a sampled Bragg grating comprising a sequence of grating samples spaced apart along said core; and
a plurality of waveguide sections comprising slots filled with a second material, each section at least partially interrupting the core and being arranged in the optical path between a respective pair of adjacent grating samples,
the second material having a refractive index which is dependent on applied electric field, whereby the optical path lengths between the samples, and hence the reflectance characteristics of the grating, may be adjusted by applying electric fields to the sections.

29. Dispersion compensation apparatus comprising a waveguide in accordance with claim 28.

30. A method of compensating for dispersion in an optical signal having a bandwidth, the method comprising the steps of:
inputting the signal to a waveguide comprising a chirped sampled Bragg grating extending along a length of the waveguide, the chirped sampled Bragg grating exhibiting a comb-like reflectance versus wavelength spectrum comprising a plurality of teeth, the waveguide comprising a core and a plurality of slots interrupting the core, said slots being spaced apart along said length of the waveguide and being filled with a material having a variable refractive index;

shifting the position of said teeth in the reflectance spectrum by adjusting the effective refractive index of the waveguide along at least a portion of said length, such that one of said teeth spans said bandwidth; and reflecting the optical signal from the chirped sampled Bragg grating.

31. A method in accordance with claim 30 wherein the step of shifting comprises adjusting the effective refractive index at each of a plurality of positions distributed along said length.

32. A method in accordance with claim 31 wherein said step of shifting comprises adjusting the effective refractive index at each said position by substantially the same amount.

33. A method in accordance with claim 31 wherein each said position lies between a respective pair of adjacent samples of the sampled Bragg grating.

34. A method in accordance with claim 33 wherein a respective one of said plurality of positions lies between each pair of adjacent samples, such that the step of shifting comprises adjusting the effective refractive index of the waveguide between every pair of adjacent samples.

35. A method in accordance with claim 31, wherein each slot is arranged at a respective one of said plurality of positions and being filled with a material having a high temperature coefficient of refractive index, and wherein the step of shifting comprises adjusting the temperature of the material in each slot.

36. A method in accordance with claim 35 wherein each slot is positioned between a respective pair of adjacent samples of the sampled Bragg grating.

37. A method in accordance with claim 36 wherein a respective slot is positioned between each pair of adjacent samples, such that the step of shifting comprises adjusting the temperature of the material in the slots between every pair of adjacent samples.

38. A method in accordance with claim 31, wherein each slot is arranged at a respective one of said plurality of positions and being filled with a material having a refractive index which is dependent on applied electric field, and wherein the step of shifting comprises adjusting an electric field applied to the material in each slot.

39. A method in accordance with claim 38 wherein each slot is positioned between a respective pair of adjacent samples of the sampled Bragg grating.

40. A method in accordance with claim 37 wherein a respective slot is positioned between each pair of adjacent samples, such that the step of shifting comprises adjusting the electric field applied to the material in the slots between every pair of adjacent samples.

41. A method in accordance with claim 30 wherein said step of shifting comprises adjusting the effective refractive index by a uniform amount along said length.

42. A method in accordance with claim 41, wherein the waveguide includes a cladding, and the step of shifting comprises making a substantially uniform the temperature of said cladding along said length.

43. A method in accordance with claim 42 wherein said cladding comprises a material having a high temperature coefficient of refractive index.

44. A method in accordance with claim 30, further comprising the step of altering the dispersion imparted to the optical signal by said reflection by adjusting the effective refractive index of the waveguide along at least a portion of said length to provide a variation in effective refractive index along said length.

45. A method in accordance with claim 44 wherein said variation comprises a linear component.

46. A method in accordance with claim 44 wherein said variation comprises a quadratic component.

47. A method in accordance with claim 44 wherein said step of altering the dispersion comprises adjusting the refractive index at each of a plurality of positions distributed along said length.

48. A method in accordance with claim 47 wherein each said position lies between a respective pair of adjacent samples of the sampled Bragg grating.

49. A method in accordance with claim 48 wherein a respective one of said plurality of positions lies between each pair of adjacent samples, such that the step of altering the dispersion comprises adjusting the effective refractive index of the waveguide between every pair of adjacent samples.

50. A method in accordance with claim 47, wherein each slot is arranged at a respective one of said plurality of positions and being filled with a material having a high temperature coefficient of refractive index, and wherein the step of altering the dispersion comprises adjusting the temperature of the material in each slot.

51. A method in accordance with claim 50 wherein each slot is positioned between a respective pair of adjacent samples of the sampled Bragg grating.

52. A method in accordance with claim 51 wherein a respective slot is positioned between each pair of adjacent samples, such that the step of altering the dispersion comprises adjusting the temperature of the material in the slops between every pair of adjacent samples.

53. A method in accordance with claim 47, wherein each slot is arranged at a respective one of said plurality of positions and being filled with a material having a refractive index which is dependent on applied electric field, and wherein the step of altering the dispersion comprises adjusting an electric field applied to the material in each slot.

54. A method in accordance with claim 53 wherein each slot is positioned between a respective pair of adjacent samples of the sampled Bragg grating.

55. A method in accordance with claim 44 wherein a respective slot is positioned between each pair of adjacent samples, such that the step of altering the dispersion comprises adjusting the electric field applied to the material in the slots between every pair of adjacent samples.

56. A method in accordance with claim 44, wherein said step of altering the dispersion comprises the step of setting a desired continuous distribution of effective refractive index along said length.

57. A method in accordance with claim 56, wherein the waveguide includes a cladding, and said distribution is set by applying a temperature or electric field distribution to the cladding along said length.

58. A method of compensating for dispersion in an optical signal having a bandwidth, the method comprising the steps of:

inputting the signal to waveguide comprising a sampled Bragg grating extending along a length of the waveguide, the sampled Bragg grating exhibiting a comb-like reflectance versus wavelength spectrum comprising a plurality of teeth, the waveguide comprising a core and a plurality of slots interrupting the core, said slots being spaced apart along said length of the waveguide and being filled with a material having a variable refractive index;

chirping the sampled Bragg grating by adjusting the effective refractive index of the waveguide at a plurality of positions along said length to set a variation in effective refractive index along said length;

shifting the positions of raid teeth in the reflectance spectrum by further adjusting the effective refractive index at said plurality of positions, such that one of said teeth spans said bandwidth; and reflecting the optical signal from the chirped, sampled Bragg grating.

59. A method of compensating for dispersion in an optical signal, the method comprising the steps of:

inputting the signal to a waveguide comprising a sampled Bragg grating extending along a length of the waveguide, the waveguide comprising a core and a plurality of slots interrupting the core, said slots being spaced apart along said length of the waveguide and being filled with a material having a variable refractive index;

reflecting the signal from the sampled Bragg grating; and adjusting the profile of the waveguide effective refractive index along said length to adjust the dispersion imparted to the signal by said reflection.

60. A method in accordance with claim 59, wherein the sampled Bragg grating exhibits a comb-like reflectance versus wavelength spectrum comprising a plurality of teeth, and the step of adjusting comprises adjusting the position of the teeth in the spectrum to bring one of the teeth into register with the bandwidth of the signal.

61. Dispersion compensation apparatus comprising waveguide comprising an optical reflector extending along a length of the a waveguide, the reflector exhibiting a comb-like reflectance versus wavelength spectrum comprising a plurality of teeth, the waveguide comprising a core and a plurality of slots interrupting the core, said slot being spaced apart along said length of the waveguide and being filled with a material having a variable refractive index; and adjustment apparatus arranged to adjust an effective refractive index profile of the waveguide along said length of adjust at least one of:
  1) the dispersion imparted to a signal on reflection by the reflector and
  2) the position of the teeth in the spectrum.

* * * * *